US010598267B2

(12) United States Patent
Hentsch et al.

(10) Patent No.: US 10,598,267 B2
(45) Date of Patent: Mar. 24, 2020

(54) ROTOR FOR CAM PHASER WITH IMPROVED GEOMETRY

(71) Applicant: Hilite Germany GmbH, Marktheidenfeld (DE)

(72) Inventors: Florian Hentsch, Gruibingen (DE); Karl-Heinz Isenberg, Trier (DE); Stefan Klotz, Aichtal (DE); Rainer Maier, Wolfschlugen (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 14/884,260

(22) Filed: Oct. 15, 2015

(65) Prior Publication Data

US 2016/0230867 A1 Aug. 11, 2016

Related U.S. Application Data

(63) Continuation of application No. PCT/EP2014/063885, filed on Jun. 30, 2014.

(30) Foreign Application Priority Data

| Jul. 5, 2013 | (DE) | 10 2013 107 132 |
| Jul. 5, 2013 | (DE) | 10 2013 107 133 |
| Jul. 12, 2013 | (DE) | 10 2013 107 434 |

(51) Int. Cl.
*F16H 53/02* (2006.01)
*F01L 1/047* (2006.01)
(Continued)

(52) U.S. Cl.
CPC .............. *F16H 53/02* (2013.01); *F01L 1/047* (2013.01); *F01L 1/34* (2013.01); *F01L 1/3442* (2013.01);
(Continued)

(58) Field of Classification Search
CPC ........ F16H 53/04; F16H 53/025; F16H 53/02; F01L 1/3442; F01L 1/34; F01L 1/047;
(Continued)

(56) References Cited

U.S. PATENT DOCUMENTS 7,246,580 B2 * 7/2007 Palesch .................. F01L 1/047
123/90.15
2006/0278189 A1* 12/2006 Knecht ................. F01L 1/3442
123/90.17
(Continued)

FOREIGN PATENT DOCUMENTS

DE 102008032949 A1 1/2010
DE 102008033812 A1 1/2010

*Primary Examiner* — Daniel D Yabut
(74) *Attorney, Agent, or Firm* — Von Rohrscheidt Patents

(57) ABSTRACT

A rotor for a cam phaser, the rotor rotating about a rotation axis and the rotor including a first face; a receiving face arranged opposite to the first face; a central portion; at least one lobe that is arranged at the central portion and which extends away from the central portion in a radial direction; and a cam shaft receiving recess provided at the receiving face and configured to receive a cam shaft, wherein the cam shaft receiving recess includes an inside surface, wherein at least two cam shaft centering elements are arranged at the inside surface for centering the cam shaft, and wherein the cam shaft centering elements are configured as protrusions. The invention also relates to a joining kit.

15 Claims, 3 Drawing Sheets

(51) Int. Cl.
  *F01L 1/344* (2006.01)
  *F04C 15/00* (2006.01)
  *F16H 53/04* (2006.01)
  *F01L 1/34* (2006.01)

(52) U.S. Cl.
  CPC ......... *F04C 15/0061* (2013.01); *F16H 53/04* (2013.01); *F01L 2001/34479* (2013.01); *F01L 2103/00* (2013.01); *F01L 2820/01* (2013.01)

(58) Field of Classification Search
  CPC .... F01L 2001/3445; F01L 2001/34496; F02D 13/0219; F04C 15/0061; Y10T 74/2102
  See application file for complete search history.

(56) References Cited

U.S. PATENT DOCUMENTS

2012/0132160 A1    5/2012  Malen et al.
2015/0075465 A1*   3/2015  Harding ................ F01L 1/3442
                                                      123/90.16

* cited by examiner

ROTOR FOR CAM PHASER WITH IMPROVED GEOMETRY

RELATED APPLICATIONS

This application is a continuation of International Application PCT/EP2014/063885 filed on Jun. 30, 2014 claiming priority from German patent application DE 10 2013 107 132.5 filed on Jul. 5, 2013, DE 10 2013 107 133.3 filed on Jul. 5, 2013 and DE 10 2013 107 434.0 filed on Jul. 12, 2013 all of which are incorporated in their entirely by this reference.

FIELD OF THE INVENTION

The invention relates to a rotor for a cam phaser.

BACKGROUND OF THE INVENTION

Several embodiments of cam phasers are known in the art. The instant invention relates to the genus of hydraulic cam phasers. Hydraulic cam phasers can be configured for example as cam phasers which operate according to the lobe shaft principle. The instant invention relates a type of cam phaser which includes a stator and a rotor. The rotor is arranged within the stator and includes a plurality of lobes. A lobe or plural lobes form at least two cavities with respective opposite elements of the stator, wherein the cavities are offset relative to one another in a manner so that a filling of a first cavity causes at least partial emptying of the second cavity and thus simultaneously causes a rotation of the rotor. Rotating the rotor rotates a cam shaft that is fitted to the rotor. The cam shaft is adjustable at least between a first position and a second position using the cam phaser of this type, thus using a hydraulic fluid, for example an oil. In order to achieve a smooth function over a long time period and over a large number of shifting cycles an approach can be used to optimize a centering of the cam shaft so that eccentricity is substantially avoided or kept as small as possible.

BRIEF SUMMARY OF THE INVENTION

Thus, it is an object of the invention to improve a rotor for a cam phaser.

The object is achieved by a rotor for a cam phaser. The object is achieved additionally by a fitting kit. Additional advantageous embodiments and improvements can be derived from the subsequent description and the drawing figures. One or plural features of the claims, the description and also of the drawing figures can be combined with one or plural features to form additional embodiments of the invention. In particular also one or plural features of the independent claims can be replaced by one or plural other features from the description and/or the figures. The proposed patent claims are only a draft definition of the object of the invention without limiting the object.

A rotor for a cam phaser is proposed, the rotor rotating about a rotation axis and the rotor including a first face: a receiving face arranged opposite to the first face; a central portion; at least one lobe that is arranged at the central portion and which extends away from the central portion in a radial direction; and a cam shaft receiving recess provided at the receiving face and configured to receive a cam shaft, wherein the cam shaft receiving recess includes an inside surface, wherein at least two cam shaft centering elements are arranged at the inside surface for centering the cam shaft, and wherein the cam shaft centering elements are configured as protrusions.

The object is also achieved by a joining kit including at least one rotor described supra and at least one cam shaft provided for insertion into the cam shaft receiving recess, the at least one cam shaft provided with a cross sectional dimension predetermined for this purpose in an insertion portion of the cam shaft, characterized in that a radial extension of the protrusions has a tolerance range of less than 30 μm and more than 10 μm with the cam shaft of the joining kit, advantageously less than 25 μm and more than 15 μm, particularly advantageously 20 μm The at least one lobe is arranged at the center portion. The lobe extends in a radially outward direction from the center portion.

Thus, at least two cam shaft centering elements are arranged at the inside surface. The cam shaft centering elements are configured as protrusions.

Providing the rotor for a rotation about a rotation axis means in this context that a rotation is provided in an angle range which is required for an adjustment of a cam shaft from a first position to a second position and back. The term rotation about a rotation axis, however, does not infer that a complete rotation shall be required.

The term that a receiving face is arranged opposite to the first face means that this is a first face and a second face of the same element, wherein the second face is arranged as a receiving face on a different side of the rotor than the first face. Advantageously the rotor is an element with a basic geometric shape which can be derived from a cylindrical element. It is particularly advantageous that the first face and the receiving face are essentially oriented parallel to one another. A parallel orientation of the first face relative to the second face thus not only provides simpler fabrication but also provides a significant reduction of leakage of the system.

Term receiving face means that the receiving face is a face which is suitable and advantageously also configured to introduce the cam shaft into the rotor when joining the cam shaft with the rotor coming from the receiving face.

The term central portion designates a portion of the rotor which contacts the cam shaft directly or indirectly in a joined condition of the cam shaft and the rotor.

A lobe originates from the central portion, wherein the lobe is advantageously bonded to the central portion. Advantageously the rotor is s rotor with at least three lobes. The term of an orientation of the lobe that is radially oriented away from the central portion means in particular that a center of gravity plane of the lobe which also includes the rotation axis has a major radial directional component that is oriented away from the rotation axis and a minor portion that is tangentially oriented about the rotation axis. However, it shall not be excluded that the lobe is for example curved in a direction tangentially extending about the rotation axis. It can also be provided for example that the lobe includes side surfaces which are tilted relative to a plane including the rotation axis. In an advantageous embodiment the lobe or all lobes include a plane of symmetry in which the rotation axis of the cam shaft is arranged.

The term cam shaft receiving recess means that a recess is arranged in the central portion of the rotor, wherein the recess is configured for a partial insertion of the cam shaft if the cam shaft includes a suitable cross sectional surface and cross sectional shape. It shall not be excluded that the cam shaft receiving recess is a pass through hole which penetrates the rotor in its entirety. Advantageously the cam shaft receiving recess is a recess which has a base in a volume of the central portion of the rotor. It is thus particularly advantageous that the base is arranged in its entirety essentially perpendicular to the rotation axis so that the cam shaft receiving recess essentially forms a semi space which forms a cylindrical cavity or an essentially cylindrical cavity with an imaginary completed receiving face cover.

The term inside surface designates the inner surface of the cam shaft receiving recess without the base that is created when the rotor is not penetrated completely. Thus, the inside surface is a portion of the enveloping surface of the cavity described supra which does not form the base or an imaginary cover of the cavity described supra. Edges that may be provided at the inner surface shall not prevent that the entire circumferential surface of the rotation axis is designated as inner surface according to the instant definition. At the inside surfaces in the advantageous embodiment described supra of the cavity generated by the cam shaft receiving recess configured as a cylindrical cavity the inside surface is provided as an enveloping surface of the circular cylindrical cavity.

At the inside surface at least two cam shaft centering elements are arranged. The cam shaft centering elements are protrusions which extend from the volume of the rotor at the inside surface.

In one embodiment of the rotor it is provided that the cam shaft receiving recess has a circular opening surface.

In another embodiment of the rotor it can be provided for example that the inside surface is oriented completely parallel to the rotation axis. This is the case for example when the cam shaft receiving recess is configured as an essentially cylindrical element.

A circular opening surface of the cam shaft receiving recess has the advantage that it is configured for receiving cam shafts with a cross sectional surface that is also circular which is the most widely used configuration for cam shafts. The high level of rotation symmetry of a circular cam shaft receiving recess is particularly advantageous in that fabrication is simplified considerably and centering is maintained over a particularly high number of rotation cycles.

In another embodiment of the rotor it can also be provided for example that the rotor includes an uneven number of cam shaft centering elements. An uneven number of cam shaft centering elements has the advantage that centering the cam shaft can be provided in a particularly advantageous manner based on a geometry of the elements. This applies in particular for the case of a circular opening surface of the cam shaft receiving recess.

In one embodiment of the rotor it can be provided for example that the rotor includes exactly three cam shaft centering elements. A number of three cam shaft centering elements provides particularly advantageous centering for the cam shaft, in particular for a circular opening surface of the cam shaft receiving recess.

In another embodiment of the rotor it can be provided for example that the rotor includes three cam shaft centering elements with essentially identical configurations. It can be provided for example that geometric centers of gravity of the cam shaft centering elements form an even sided triangle in a top view of the rotor for example using the rotation axis as a viewing axis. This configuration with a high level of symmetry is achieved for example in particular for a cam shaft with a circular cross section and thus a circular cam shaft receiving recess yields particularly advantageous centering of the cam shaft for an advantageous fabrication of the cam shaft.

It can also be provided that the rotor includes exactly five cam shaft centering elements which generate an even sided pentagon with their geometric centers of gravity in a top view for example when the rotation axis is the viewing axis. This yields excellent cam shaft centering combined with advantageous manufacturing properties like for the embodiment cited supra that has exactly three cam shaft centering elements.

In another embodiment of the rotor it can be provided for example that the number of cam shaft centering elements is identical with the number of the lobes. This has the advantage that a deviation from a centered alignment of the cam shaft is prevented by the advantageous geometry in a particularly effective manner.

This effect can be improved even further in that an embodiment of the rotor is provided, where an angle distribution of the cam shaft centering elements corresponds to an angle distribution of the lobes.

The term angle distribution thus relates to a geometric center of gravity of the cam shaft centering elements as well as the lobes. In an advantageous embodiment of the rotor in which the cam shaft centering elements as well as the lobes have a plane of symmetry in which the rotation axis is arranged as well, the geometric center of gravity described supra is also arranged in this plane of symmetry.

A configuration of the rotor can be characterized for example in that at least two cam shaft centering elements protrude along a circular circumference cut out of the inner side surface radially in a direction of the rotation axis.

This specifies in particular that the cam shaft centering elements are protrusions that are provided in a portion of the circumference of the inner side surface described supra in a circular configuration that has already been described.

In a special embodiment of the rotor it can be provided for example that an angular extension of at least two, advantageously all cam shaft centering elements is identical.

This means in particular that the circumference cut out of the inner side surface at which a cam shaft centering element is arranged that is configured as a protrusion is identical for at least two cam shaft centering elements. Advantageously the angular extension is identical for all cam shaft centering elements since cam shaft centering elements are provided with identical embodiments in this case.

In another embodiment of the rotor it can be provided for example that an angular offset between two adjacent cam shaft centering elements is identical. In an advantageous embodiment this is the case for all cam shaft centering elements provided over the entire circumference of the inner side surface. This yields a high level of symmetry of the arrangement of the cam shaft centering elements with the associated advantage of good centering capabilities for the cam shaft.

In another embodiment of the rotor it can be provided for example that the rotor is joined from exactly two separately produced rotor elements. The joining of the rotor from two rotor elements has in particular the advantage that for example lubricant feed lines can be provided in an interior of the rotor through tube elements fabricated through master forming.

In a particularly advantageous embodiment of the rotor it can be provided for example that the rotor is made from exactly two components which have identical shapes. This last not least yields a simplified production process.

In another embodiment of the rotor it can be provided for example that the rotor is produced by a metal powder method. Besides producing rotors or rotor elements through injection molding it is particularly advantageous that a sintering method is used for producing a rotor or the rotor elements.

In particular it can also be provided that the rotor is partially or completely made from a sinter metal, a sinter steel or a sinter ceramic material.

In another embodiment of the invention it can be provided for example that a cam shaft centering element, plural cam shaft centering elements, advantageously all cam shaft centering elements are produced by a master forming method. It can be provided for example that the rotor or the rotor elements are produced by a metal powder method in particular it can be provided that the rotor or the rotor elements and thus in particular also the cam shaft centering elements are produced by a sintering method. It can be furthermore provided that adjusting a radial dimension of the cam shaft centering elements includes calibration. It can be provided in particular that calibrating the cam shaft centering elements is a step of adjusting a radial dimension. It can be provided for example that calibrating the cam shaft centering elements is a last step of adjusting a radial dimension.

The described intelligent production of the cam shaft centering elements so that they protrude from the inner side surface of the cam shaft receiving recess only partially circumferentially has the particular advantage that the protrusion after being produced by a master forming method is particularly well suited for calibration. The calibration facilitates adjusting the inner radius with a particularly high level of dimensional precision when providing the inner dimensions, for example for the embodiment with a circular circumferential surface of the cam shaft receiving recess in an embodiment with a circular opening cross section. After adjusting the interior dimensions, in particular in the cited embodiment the inner radius, there is no more need to perform complex mechanical finishing. Thus, mechanical finishing like turning that is required for known rotors can be omitted. In particular deburring may still be provided.

For example a feature of the rotor can be provided that a surface of the cam shaft centering elements is open porous. It can also be possible that a surface of the cam shaft centering elements is free from traces of mechanical finishing. It can be provided in particular that small grinding traces which are required due to the turning can be found.

Open porosity designates in particular a surface condition in which typical pores that are still provided after a centering step are open at the surface and not closed already for example by turning, honing, lapping or similar in particular mechanical finishing processes.

Another embodiment of the invention relates to a joining kit. The joining kit shall include in particular at least one rotor. Furthermore the joining kit shall include at least one cam shaft provided for insertion into a cam shaft receiving recess of a rotor. The cam shaft shall include an insertion portion. The term insertion portion thus designates a portion which is provided for inserting the rotor into the cam shaft receiving recess. In particular the insertion portion of the cam shaft can differ for example with respect to shape and/or surface area from other portions of the cam shaft. The insertion portion of the cam shaft shall have particular cross sectional dimensions.

It can be provided for example that the cross sectional dimensions have tolerances of 50 µm. It can also be provided that the cross sectional dimensions have tolerances of 30 µm.

The cross sectional dimensions in one embodiment of the cam shaft as a cam shaft with a circular cross sectional surface and/or as a cam shaft with an insertion portion with a circular cross sectional surface are defined by a cross sectional radius.

Thus, it shall be provided that the radial extension of the protrusions with the cam shaft of the joining kit has a tolerance range of less than 30 µm and more than 10 µm. It can be advantageously provided that the radial extension of the protrusions has a tolerance range of less than 25 µm and more than 15 µm with the cam shaft of the joining kit. It can be provided particularly advantageously that the radial extension of the protrusions with the cam shaft of the joining kit has a tolerance range of 20 µm. This tolerance range is important for insertability of the cam shaft into the cam shaft receiving device which is necessary for a particular clearance fit. The described values respectively designate a tolerance range of each individual cam shaft centering element.

BRIEF DESCRIPTION OF THE DRAWINGS

Further advantageous embodiments and improvements can derived from the subsequent figures. The details and features that can be derived from the figures are not limited to the embodiments illustrated in the figures. Rather one or plural features can be combined with one or plural features from the description provided supra to form new embodiments. In particular the subsequent descriptions do not define limitations of the scope of the invention but they describe individual features and their possible cooperation. In the drawings.

DETAILED DESCRIPTION OF THE INVENTION

Figure 1:
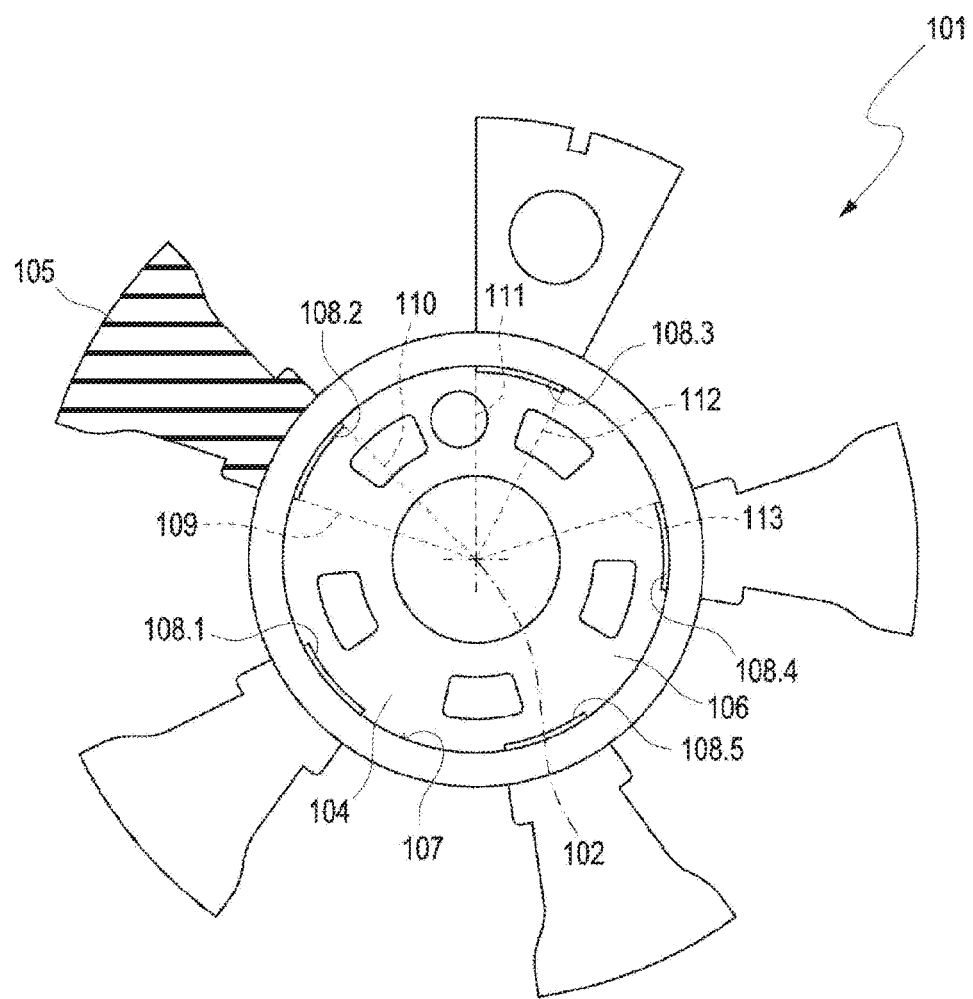
FIG. 1 illustrates a rotor for a cam phaser in a top view of a receiving face.

In the figures identical or equivalent components are designated with identical reference numerals. The figures only illustrate exemplary embodiments and do not limit the scope of the invention.

FIG. 1 shows a rotor 101 for a cam phaser. The rotor 101 is thus illustrated in a top view of a receiving face 104. A first face which is arranged opposite to the receiving face and is thus provided on the other side of the rotor 101 is thus not illustrated in FIG. 1. The rotor furthermore includes a central portion which is provided as a hollow element with an approximately circular cross section in the present embodiment of the rotor 101. Thus, the rotor 101 is a rotor with a circular cylindrical enveloping surface and a rotation axis 102 which is identical with the center point of the circular cross section in the illustrated embodiment of the rotor 101.

A first lobe 105 is arranged at the central portion and four additional lobes, wherein four of the five lobes in the illustrated embodiment of the rotor 101 are identically shaped lobes and the fifth lobe differs from the other lobes with respect to its configuration since the lobe has to perform another function. The central portion includes a cam shaft receiving recess 106 which is provided in the central portion. Since the cam shaft receiving recess 106 is provided an inside surface 107 is formed at the essentially circular central portion. The inside surface 107 includes at least two cam shaft centering elements 108.1 and 108.2. Additionally the rotor 101 includes additional cam shaft centering elements 108.3, 108.4 and 108.5. In the illustrated embodiment of the rotor 101 the cam shaft centering elements are protrusions which extend in a radial direction from the inside surface 107. In the illustrated embodiment of the rotor 101 the cam shaft centering elements 108.1, 108.2, 108.3, 108.4 and 108.5 are protrusions which are configured as partial bars as cut outs from an enveloping surface of a circular cylinder. Furthermore an angular extension of all cam shaft centering elements, thus of each of the cam shaft centering elements 108.1, 108.2, 108.3, 108.4 and 108.5 is identical. This means for example for the embodiment of the cam shaft centering elements 108.2 and 108.3 that an angle between the dashed path 109 and the dashed path 110 is identical with an angle between the dashed path 111 and the dashed path 112. This can be continued for the remaining cam shaft centering elements. Furthermore a rotor 101 is configured so that a distribution of the cam shaft centering elements is provided evenly so that an angular offset of two adjacent cam shaft centering elements is identical for each pair of two adjacent cam shaft centering elements. For the embodiment of the rotor 101 this means that for example the angle between the dashed path 110 and the dashed path 111 is identical with an angle between the dashed path 112 and the dashed path 113.

Figure 2:
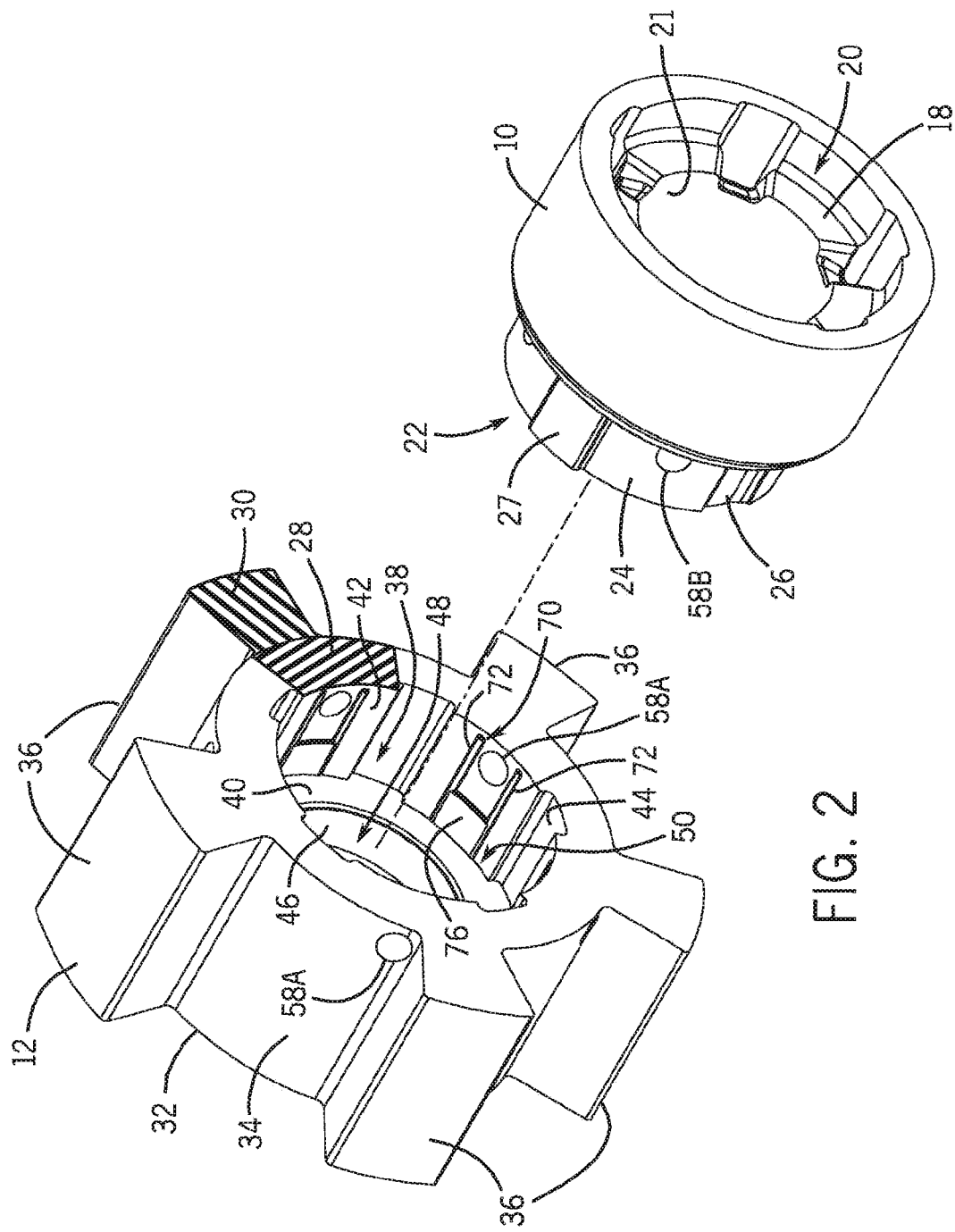
FIG. 2 illustrates a rotor for a cam phaser in a slanted view, wherein the slanted view shows the receiving face.
Figure 3:
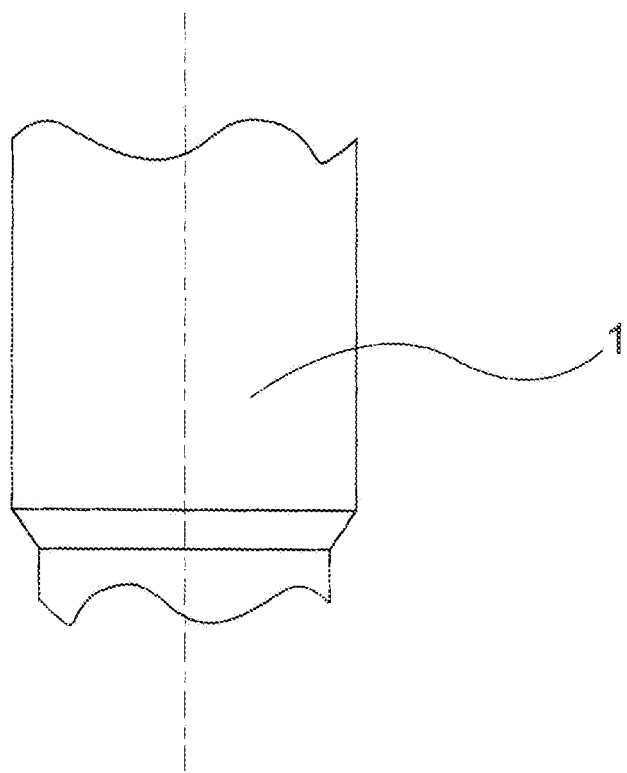
FIG. 3 illustrates a cam shaft 1 configured for insertion into the cam shaft receiving recess 106.

FIG. 2 includes another embodiment of a rotor for a cam phaser. The rotor 201 of FIG. 2 is thus illustrated in a slanted perspective view.

The slanted perspective view in this case is also illustrated comparable with the illustration of FIG. 1 looking at the receiving face 204. The first face that is arranged opposite to the receiving face is therefore not visible in FIG. 2 either. Furthermore a rotation axis 202 is drawn and the rotor 201 rotates about the rotation axis. The rotor 201 includes a central portion which is enveloped by an approximately circular cylindrical enveloping surface. A first lobe 205 is arranged at the central portion and four additional lobes in addition to the first lobe 205 wherein three of the lobes are visible in FIG. 2 and a fourth lobe is indicated in a lower portion of FIG. 2. A cam shaft receiving recess 206 is furthermore visible at the receiving face, wherein the cam shaft receiving recess essentially fills a circular cylindrical volume in the central portion of the rotor. This forms an inside surface 207 approximately corresponding to an enveloping surface of a circular cylinder.

A total of five cam shaft centering elements are configured at the inside surface 207. A first cam shaft centering element 208.1 is indicated, a second cam shaft centering element 208.2 and a third cam shaft centering element 208.3 are visible and two additional cam shaft centering elements are covered in the perspective view. In the illustrated embodiment of the rotor 201 the distribution of the cam shaft centering elements is characterized by an even angle distribution at a circumference of the inside surface. Thus, the angle between the dashed path 209 and the dashed path 210 is identical to the angle between the dashed path 211 and the dashed path 212. The angular extension of each individual cam shaft centering element in the illustrated embodiment is also identical. The angular extension, thus the angle between the dashed path 210 and the dashed path 211 is identical to the angle between the dashed path 212 and the dashed path 213.

What is claimed is:

1. A rotor for a cam phaser, the rotor rotating about a rotation axis and the rotor comprising:
a first face;
a receiving face arranged opposite to the first face;
a central portion;
at least two lobes that are arranged at the central portion and which extend away from the central portion in a radial direction; and
a cam shaft receiving recess provided at the receiving face and configured to receive a cam shaft,
wherein the cam shaft receiving recess includes an inside surface,
wherein each of the at least two lobes has an associated cam shaft centering element arranged at the inside surface for centering the cam shaft,
wherein each of the associated cam shaft centering elements is configured as a protrusion,
wherein each lobe of the at least two lobes has an angular orientation that corresponds to an angular orientation of its associated cam shaft centering element, and
wherein each of the at least two lobes shares a plane of symmetry that includes the rotation axis with the associated cam shaft centering element.

2. The rotor according to claim 1, wherein a number of the associated cam shaft centering elements corresponds to a number of the at least two lobes.

3. The rotor according to claim 1, wherein the cam shaft receiving recess has a circular opening surface.

4. The rotor according to claim 3, wherein each of the associated cam shaft centering elements protrude along a circular circumferential cut out of the inside surface radially in a direction towards the rotation axis.

5. The rotor according to claim 3, wherein an angular extension of at least two associated cam shaft centering elements is identical or an angular offset between two respective adjacent associated cam shaft centering elements is identical.

6. The rotor according to claim 1, wherein the rotor is joined from two separately produced rotor elements.

7. The rotor according to claim 1, wherein the rotor is produced partially or completely by a metal powder method.

8. The rotor according to claim 7, wherein the rotor is partially or completely made from a sinter metal, a sinter steel or a sinter ceramic material.

9. The rotor according to claim 1, wherein the associated cam shaft centering elements are produced by a master forming method and adjusting a radial dimension of the associated cam shaft centering elements includes calibrating.

10. The rotor according to claim 1, wherein a surface of the associated cam shaft centering elements is open porous or free from traces of mechanical surface finishing.

11. A joining kit, comprising:
at least one rotor according to claim 1; and
at least one cam shaft provided for insertion into the cam shaft receiving recess, the at least one cam shaft provided with a cross sectional dimension predetermined for this purpose in an insertion portion of the cam shaft,
wherein a radial extension of the protrusions has a tolerance range of less than 30 µm and more than 10 µm with the cam shaft of the joining kit.

12. The rotor according to claim 1, wherein an angular extension of at least two associated cam shaft centering elements is identical and an angular offset between two respective adjacent associated cam shaft centering elements is identical.

13. The rotor according to claim 1, wherein a surface of the associated cam shaft centering elements is open porous and free from traces of mechanical surface finishing.

14. The rotor according to claim 1, wherein each of the at least two lobes and the associated cam shaft centering element of each of the at least two lobes have a geometric center of gravity located in the plane of symmetry.

15. A rotor for a cam phaser, the rotor rotating about a rotation axis and the rotor comprising:
- a first face;
- a receiving face arranged opposite to the first face;
- a central portion;
- at least two lobes that are arranged at the central portion and which extend away from the central portion in a radial direction; and
- a cam shaft receiving recess provided at the receiving face and configured to receive a cam shaft,
- wherein the cam shaft receiving recess includes an inside surface,
- wherein each of the at least two lobes has an associated cam shaft centering element arranged at the inside surface for centering the cam shaft,
- wherein each of the associated cam shaft centering elements is configured as a protrusion,
- wherein each lobe of the at least two lobes has an angular orientation that corresponds to an angular orientation of its associated cam shaft centering element, and
- wherein each of the at least two lobes in combination with the associated cam shaft centering element have a plane of symmetry which includes the rotation axis.

* * * * *